(12) United States Patent
Sato (10) Patent No.: US 10,077,843 B2
(45) Date of Patent: Sep. 18, 2018

(54) DIVISION TYPE MECHANICAL SEAL

(71) Applicant: EAGLE INDUSTRY CO., LTD., Tokyo (JP)

(72) Inventor: Tetsuya Sato, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 14/912,041

(22) PCT Filed: Oct. 16, 2014

(86) PCT No.: PCT/JP2014/077549
§ 371 (c)(1),
(2) Date: Feb. 12, 2016

(87) PCT Pub. No.: WO2015/072275
PCT Pub. Date: May 21, 2015

(65) Prior Publication Data
US 2016/0327161 A1 Nov. 10, 2016

(30) Foreign Application Priority Data
Nov. 12, 2013 (JP) .................................. 2013-233997

(51) Int. Cl.
*F16J 15/34* (2006.01)
*F16B 19/02* (2006.01)
(Continued)

(52) U.S. Cl.
CPC ........... *F16J 15/3488* (2013.01); *F16B 19/02* (2013.01); *F16B 33/004* (2013.01); *F16B 5/0258* (2013.01); *F16B 13/0858* (2013.01)

(58) Field of Classification Search
CPC ........ F16J 15/3488; F16J 15/34; F16B 19/02; F16B 19/0258; F16B 33/00; F16B 13/0858
See application file for complete search history.

(56) References Cited

U.S. PATENT DOCUMENTS 2,426,461 A * 8/1947 Lyddon ................ F16J 15/3488
277/421
3,603,626 A * 9/1971 Whiteside ................. F16B 5/02
403/408.1
(Continued)

FOREIGN PATENT DOCUMENTS

CN 101203099 6/2008 .............. G06F 1/20
DE 3427836 A1 2/1986 ............. H01F 27/06
(Continued)

OTHER PUBLICATIONS

Chinese Office Action (w/translation) issued in application or serial No. 201480045514.7, dated Aug. 30, 2016 (14 pgs).
(Continued)

*Primary Examiner* — Eugene G Byrd
(74) *Attorney, Agent, or Firm* — Hayes Soloway P.C.

(57) ABSTRACT

A division type mechanical seal includes a through hole portion formed over two divided sealing rings so as to go over divided contact faces of the two divided sealing rings adjacent to each other in the circumferential direction, and a coupling tool inserted into the through hole portion to couple the two adjacent divided sealing rings. The coupling tool includes a bolt, a nut, and a tube fitted to a shaft portion of the bolt, and the tube is compressed in the axial direction and expanded in the outer diameter direction when the two adjacent divided sealing rings are coupled by fastening the nut.

4 Claims, 5 Drawing Sheets

(51) Int. Cl.
*F16B 33/00* (2006.01)
*F16B 13/08* (2006.01)
*F16B 5/02* (2006.01)

(56) References Cited

U.S. PATENT DOCUMENTS

| | | | | |
|---|---|---|---|---|
| 4,048,898 A * | 9/1977 | Salter | ................ | F16B 5/02 |
| | | | | 29/446 |
| 4,461,487 A * | 7/1984 | Matsumoto | .......... | B63H 23/321 |
| | | | | 277/359 |
| 4,576,384 A * | 3/1986 | Azibert | ................ | F16J 15/3488 |
| | | | | 277/370 |
| 5,370,401 A * | 12/1994 | Sandgren | ............. | F16J 15/3488 |
| | | | | 277/306 |
| 6,131,912 A * | 10/2000 | Azibert | ................ | F16J 15/3488 |
| | | | | 277/348 |
| 6,485,024 B1 * | 11/2002 | Pippert | ................ | F16J 15/3452 |
| | | | | 277/370 |
| 2004/0130100 A1 * | 7/2004 | Oram | ................ | F16J 15/3488 |
| | | | | 277/358 |
| 2005/0087931 A1 | 4/2005 | Yamauchi et al. | ............ | 277/358 |
| 2008/0163412 A1 * | 7/2008 | Furukawa | .............. | A47K 13/26 |
| | | | | 4/252.1 |
| 2009/0238657 A1 * | 9/2009 | Brandt | ................ | B60R 21/01 |
| | | | | 411/44 |
| 2010/0264597 A1 * | 10/2010 | Sato | ................ | F16J 15/3488 |
| | | | | 277/358 |
| 2013/0164095 A1 * | 6/2013 | Chou | ................ | F16B 5/0258 |
| | | | | 411/347 |
| 2014/0161562 A1 * | 6/2014 | Dechant | ................ | F16B 41/00 |
| | | | | 411/500 |
| 2014/0238334 A1 * | 8/2014 | Griffiths | ................ | F16B 43/00 |
| | | | | 123/196 CP |
| 2014/0270936 A1 * | 9/2014 | Gerendas | ................ | F16B 19/02 |
| | | | | 403/408.1 |

FOREIGN PATENT DOCUMENTS

| | | | | |
|---|---|---|---|---|
| JP | 476802 | 2/1972 | ................ | D4/53 |
| JP | H0333337 | 2/1991 | ............... | E04B 1/38 |
| JP | 2003074798 | 3/2003 | ............... | F16J 15/10 |
| JP | 2005127436 | 5/2005 | ............... | F16D 1/06 |
| JP | 2010019373 | 1/2010 | ............... | F16J 15/34 |
| WO | WO2013054610 | 4/2015 | ............... | F16J 15/34 |

OTHER PUBLICATIONS

International Search Report and Written Opinion issued in application No. PCT/JP2014/077549, dated Jan. 6, 2015 (8 pgs).
International Preliminary Report on Patentability issued in application No. PCT/JP2014/077549, dated May 26, 2016 (7 pgs).
Office Action issued in corresponding Chinese Patent Application Serial No. 201480045514.7 dated May 24, 2017 with English translation (13 pages).
Chinese Office Action (w/ translation) issued in application No. 201480045514.7, dated Dec. 18, 2017 (13 pgs).

* cited by examiner

DIVISION TYPE MECHANICAL SEAL

TECHNICAL FIELD

The present invention relates to a mechanical seal used for various rotating machinery such as an agitator, a compressor, and a pump, the mechanical seal that does sealing by sealing end faces serving as opposing end faces of a stationary sealing ring and a rotating sealing ring. In particular, the present invention relates to a division type mechanical seal in which a stationary sealing ring or a rotating sealing ring is divided in the circumferential direction.

BACKGROUND ART

Conventionally, there is a known division type mechanical seal in which a stationary sealing ring and a rotating sealing ring are divided into at least two pieces by at least two divided faces in the radial direction, a projecting streak and a groove fitted to each other are formed on the divided faces, the protruding streak and the groove are provided over the entire axis direction between an edge on the end face side of one of the divided faces and an edge of the end face side of the other, and a flange is provided on the opposite side of a seal case (for example, refer to Patent Citation 1. Hereinafter, referred to as "Prior Art 1").

Similarly, there is also a known division type mechanical seal in which a stationary sealing ring is formed by a plurality of divided bodies in the circumferential direction, inserted into an installment hole, and held in an annular form, a rotating sealing ring includes two divided bodies, and the two divided bodies are coupled to each other by a coupling bolt, the mechanical seal including a taper hole formed over the two divided bodies so as to go over abutting faces of the two divided bodies, a taper pin inserted into an inner face of the taper hole in a closely attached state, and a fixing tool that fixes the taper pin inserted into the taper hole (for example, refer to Patent Citation 2. Hereinafter, referred to as "Prior Art 2").

CITATION LIST

Patent Document

Patent Citation 1: JP2005-127436 A
Patent Citation 2: JP2010-19373 A

SUMMARY OF INVENTION

Technical Problem

In the division type mechanical seal of Prior Art 1 described above, the projecting streak and the groove fitted to each other are formed on the divided faces for positioning the division faces in the radial direction, and there is a need for providing the flange on the opposite side of the seal face for positioning the division faces in the axial direction. Thus, a precision requirement level of the projecting streak and the groove provided on the divided faces and the flange provided on the opposite side of the seal face is high, and generation of an even small precision error directly leads to leakage. Therefore, it takes a long time for mechanical processing and hence there is a problem that cost is high.

In the division type mechanical seal of Prior Art 2 described above, there is a need for implementing processing in which precision of the hole to be formed is strict at the same time, and hence it takes a long time for the processing. There are also needs for confirmation of abutment of the taper pin and an abutment refining task (surface finishing). There is also a need for a large load at the time of disassembling and hence there is a problem that temporary assembling adjustment is difficult.

An objective of the present invention is to provide a division type mechanical seal divided in the circumferential direction with which assembling precision on divided contact faces are improved, workability at the time of temporary assembling is refined, and further, no excessive precision is required in mechanical processing at the time of manufacturing.

Solution to Problem

In order to achieve the foregoing objective, a first aspect of the present invention is a division type mechanical seal in which a stationary sealing ring provided on the side of a housing or a rotating sealing ring provided in a rotation shaft which is inserted into the housing is a divided sealing ring divided in the circumferential direction, the division type mechanical seal that does sealing by sealing end faces serving as opposing end faces of the stationary sealing ring and the rotating sealing ring, the division type mechanical seal including a through hole portion formed over two divided sealing rings so as to go over divided contact faces of the two divided sealing rings adjacent to each other in the circumferential direction, an a coupling tool inserted into the through hole portion to couple the two adjacent divided sealing rings, characterized in that the coupling tool includes a bolt, a nut, and a tube fitted to a shaft portion of the bolt, and the tube is compressed in the axial direction and expanded in the outer diameter direction when the two adjacent divided sealing rings are coupled by fastening the nut.

According to this aspect, assembling precision on the divided contact faces of the divided sealing rings is ensured in the radial direction and in the axial direction.

Unlike in the conventionally known metal taper pin, confirmation of abutment and an abutment refining task (surface finishing) can be deleted. Thus, a processing time can be shortened to a great extent.

In a case of the conventionally known metal taper pin, there is a need for a task of improving precision. However, since the tube of the coupling tool follows the shape and the size of the through hole portion, there is no need for the task of improving precision and hence a processing property is refined.

A temporary assembling state of the divided sealing rings can be maintained by utilizing friction between an outer face of the tube and an inner face of the through hole portion due to deformation of the tube. Thus, at the time of a task of adjusting the divided contact faces of the divided sealing rings in a state where the nut of the coupling tool is not fastened or the like, the divided sealing rings can be stably held. That is, a temporary assembling task can be easily performed.

Since a deformation amount of the tube can be adjusted by a screw-in amount of the nut, flexible correspondence can be provided in accordance with a situation at the time of the task.

In case of the conventionally known metal taper pin, when an excessive load is applied to the divided sealing rings made of a brittle material at the time of assembling, this leads to breakage of the divided sealing rings. However, in a case of the coupling tool, even when an excessive load is applied, the tube serves as a buffering member and hence no breakage is caused.

At the time of disassembling the divided sealing rings, in a case of the conventionally known metal taper pin, too close attachment generates large resistance, and thus detachment becomes difficult at the worst. However, in a case of the coupling tool, since the tube is deformed, detachment is easily performed.

A second aspect of the division type mechanical seal of the present invention relates to the first aspect, characterized in that the tube is formed in a tubular body made of synthetic resin.

According to this aspect, a property of inserting the coupling tool into the through hole portion of the divided sealing rings and contradicting resistance are moderately favorable. Thus, workability can be improved.

A third aspect of the division type mechanical seal of the present invention relates to the second aspect, characterized in that an outer diameter of the shaft portion of the bolt is set to be larger than an inner diameter of the tube.

According to this aspect, deformation of the tube toward the inner diameter side can be prevented and the tube can be efficiently expanded to the outer diameter side.

A fourth aspect of the division type mechanical seal of the present invention relates to the first aspect, characterized in that the tube is made of deformable metal and formed in a spiral shape linear body or a tubular body having a cut face in the longitudinal direction.

According to this aspect, the tube capable of being expanded in the outer diameter direction can be obtained by mechanical processing.

A fifth aspect of the division type mechanical seal of the present invention relates to the fourth aspect, characterized in that the tube is preliminarily formed in a shape to be easily expandable in the outer diameter direction in the vicinity of center in the axial direction.

According to this aspect, the deformation of the tube toward the inner diameter side can be surely prevented and the tube can be efficiently expanded to the outer diameter side.

A sixth aspect of the division type mechanical seal of the present invention relates to the fourth or fifth aspect, characterized in that the tube is supported by taper faces at both ends so as to be easily expandable in the outer diameter direction in the vicinity of the center of the axial direction.

According to this aspect, the deformation of the tube toward the inner diameter side can be further prevented and the tube can be efficiently expanded to the outer diameter side.

A seventh aspect of the present invention is a division type mechanical seal in which a stationary sealing ring provided on the side of a housing or a rotating sealing ring provided in a rotation shaft which is inserted into the housing is a divided sealing ring divided in the circumferential direction, the division type mechanical seal that does sealing by sealing end faces serving as opposing end faces of the stationary sealing ring and the rotating sealing ring, the division type mechanical seal including a through hole portion formed over two divided sealing rings so as to go over divided contact faces of the two divided sealing rings adjacent to each other in the circumferential direction, a female screw portion formed in the through hole portion in one of the two divided sealing rings, and a coupling tool inserted into the through hole portion to couple the two adjacent divided sealing rings, characterized in that the coupling tool includes a bolt and a tube fitted to a shaft portion of the bolt, and the tube is compressed in the axial direction and expanded in the outer diameter direction by the bolt and one of the divided sealing rings in which the female screw portion is formed when the two adjacent divided sealing rings are coupled by fastening the bolt.

According to this aspect, no nut is required. Thus, the number of parts can be reduced, and a task of screwing the bolt can be easily performed even upon fastening flange portions by the coupling tool.

Advantageous Effects of Invention

The present invention exhibits the following superior effects.

(1) Assembling precision on the divided contact faces of the divided sealing rings can be ensured in the radial direction and in the axial direction.

Unlike in the conventionally known metal taper pin, the confirmation of the abutment and the abutment refining task (surface finishing) can be deleted. Thus, the processing time can be shortened to a great extent.

In a case of the conventionally known metal taper pin, there is a need for the task of improving precision. However, since the tube of the coupling tool follows the shape and the size of the through hole portion, there is no need for the task of improving precision and hence the processing property is refined.

The temporary assembling state of the divided sealing rings can be maintained by utilizing friction between the outer face of the tube and the inner face of the through hole portion due to the deformation of the tube. Thus, at the time of the task of adjusting the divided contact faces of the divided sealing rings in a state where the nut of the coupling tool is not fastened or the like, the divided sealing rings can be stably held. That is, the temporary assembling task can be easily performed.

Since the deformation amount of the tube can be adjusted by the screw-in amount of the nut, flexible correspondence can be provided in accordance with the situation at the time of the task.

In case of the conventionally known metal taper pin, when an excessive load is applied to the divided sealing rings made of the brittle material at the time of assembling, this leads to the breakage of the divided sealing rings. However, in a case of the coupling tool, even when an excessive load is applied, the tube serves as the buffering member and hence no breakage is caused.

At the time of disassembling the divided sealing rings, in a case of the conventionally known metal taper pin, too close attachment generates large resistance, and thus the detachment becomes difficult at the worst. However, in a case of the coupling tool, since the tube is deformed, the detachment is easily performed.

(2) Since the tube is formed in a tubular body made of synthetic resin, the property of inserting the coupling tool into the through hole portion of the divided sealing rings and contradicting resistance are moderately favorable. Thus, the workability can be improved.

(3) Since the outer diameter of the shaft portion of the bolt is set to be larger than the inner diameter of the tube, the deformation of the tube toward the inner diameter side can be prevented and the tube can be efficiently expanded to the outer diameter side.

(4) Since the tube is made of deformable metal and formed in a spiral shape linear body or a tubular body having a cut face in the longitudinal direction, the tube capable of being expanded in the outer diameter direction can be obtained by mechanical processing.

(5) Since the tube is preliminarily formed in a shape to be easily expandable in the outer diameter direction in the vicinity of the center in the axial direction, the deformation of the tube toward the inner diameter side can be surely prevented and the tube can be efficiently expanded to the outer diameter side.

(6) Since the tube is supported by the taper faces at both the ends so as to be easily expandable in the outer diameter direction in the vicinity of the center of the axial direction, the deformation of the tube toward the inner diameter side can be further prevented and the tube can be efficiently expanded to the outer diameter side.

(7) Since the female screw portion is formed in one of the through hole portion formed over the two divided sealing rings, no nut is required. Thus, the number of parts can be reduced, and the task of screwing the bolt can be easily performed even upon fastening the flange portions by the coupling tool.

BRIEF DESCRIPTION OF DRAWINGS

FIG. 3(a) shows a state seen from the side of the divided contact faces; and FIG. 3(b) shows a state seen from the back side of the divided contact faces;

FIG. 4(a) shows a disassembled state of the coupling tool; and FIG. 4(b) shows a state where the coupling tool is installed to the divided contact faces of the two adjacent divided sealing rings; FIG. 5(a) is a sectional view showing a state where the coupling tool is installed to the divided contact faces of the two adjacent divided sealing rings; and FIG. 5(b) shows a disassembled state of the coupling tool.

DESCRIPTION OF EMBODIMENTS

Hereinafter, with reference to the drawings, modes for carrying out the present invention will be described and exemplified based on embodiments. However, regarding size, material, shape, and relative arrangement of constituent parts described in the embodiments, and the like, there is no intention to limit the scope of the present invention only to those unless specifically and clearly described.

In the best modes for carrying out a division type mechanical seal according to the present invention to be described below, for convenience of description, a complete division type mechanical seal in which both sealing rings of a stationary sealing ring provided on the side of a housing and a rotating sealing ring provided in a rotation shaft which is inserted into the housing are divided will be described as an example. However, the present invention is not limited to this but also includes a division type mechanical seal in which at least one of a stationary sealing ring provided on the side of a housing and a rotating sealing ring provided in a rotation shaft which is inserted into the housing is divided.

First Embodiment

Figure 1:
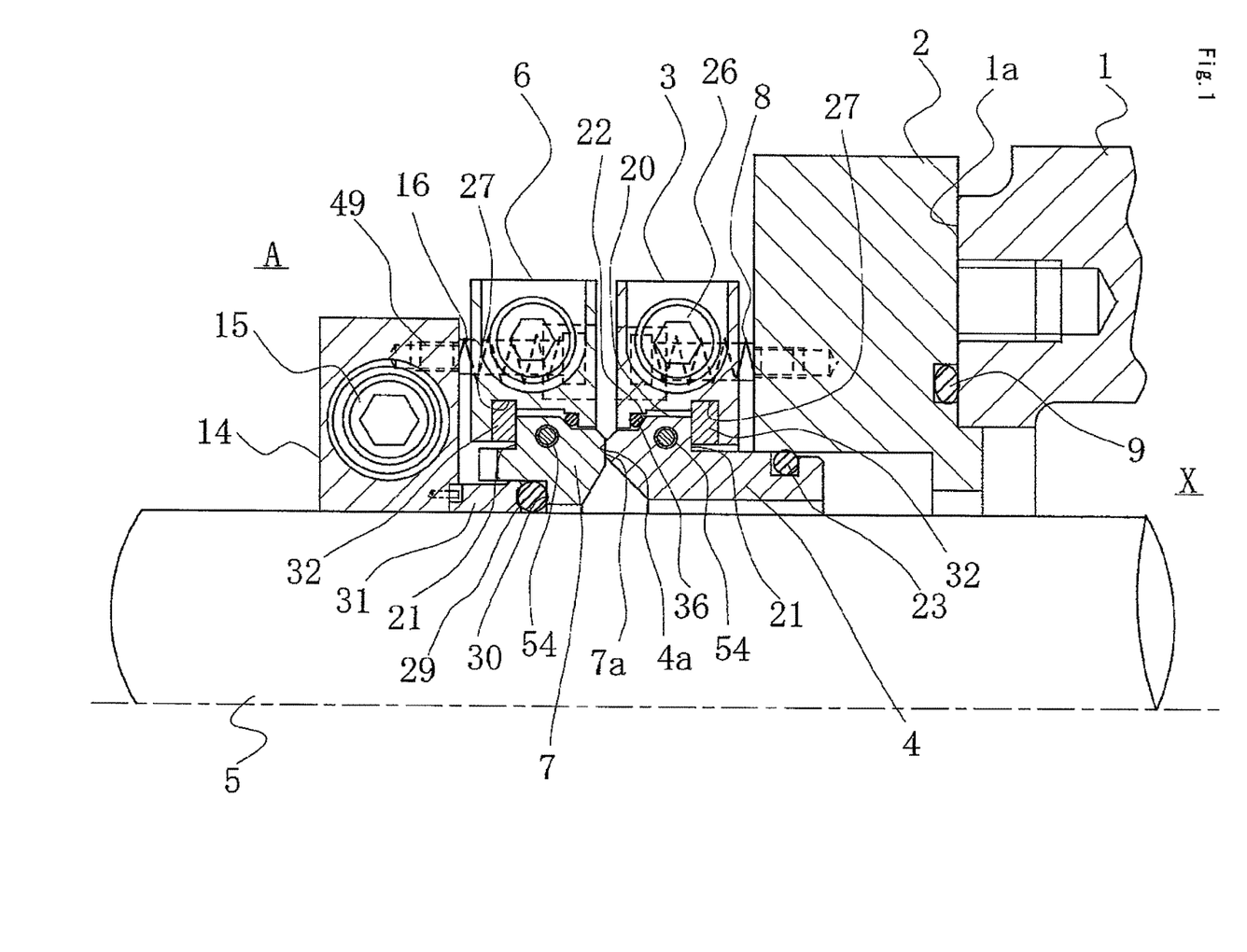
FIG. 1 is a front sectional view for illustrating the entire division type mechanical seal according to a first embodiment of the present invention.

FIG. 1 is a front sectional view for illustrating the entire division type mechanical seal according to the present embodiment. The right side of the paper plane is a sealed fluid region X and the left side is a non-sealed fluid region (atmosphere region) in the description.

As shown in FIG. 1, the division type mechanical seal according to the first embodiment of the present invention is an outside mechanical seal including a seal case 2 attached to a shaft sealing portion 1a of a rotation shaft insertion part of a housing 1 of a pump or the like, a stationary sealing ring 4 held on the seal case 2 via a division retainer 3 so as to be capable of moving in the axial line direction and incapable of relatively rotating, a rotating sealing ring 7 arranged on the left of the stationary sealing ring 4 and fixed to a rotating shaft 5 of a pump or the like via a division retainer 6, and a spring 8 placed between the seal case 2 and the division retainer 3, the spring that biases the stationary sealing ring 4 leftward so as to press and bring the stationary sealing ring into contact with the rotating sealing ring 7, wherein by a relative rotation sliding operation of sealing end faces 4a, 7a serving as opposing end faces of both the sealing rings 4, 6, a sealed fluid region (region communicating with an interior of the housing 1 of a pump or the like) X serving as an inner circumferential region of the sealing end faces 4a, 7a and a non-sealed fluid region (atmosphere region out of the housing 1 of a pump or the like) A serving as an outer circumferential region of the sealing end faces are shielded.

In the first embodiment, the outside mechanical seal is described as an example. However, the present invention is not limited to the outside mechanical seal but can also be applied to other types such as an inside mechanical seal needless to say.

As shown in FIG. 1, the seal case 2 is formed in an annular body having an inner circumferential part of a diameter larger than that of the rotating shaft 5. In a state where the rotating shaft 5 is inserted in a concentric manner, the seal case is attached to the shaft sealing portion 1a of the housing 1 by a bolt (not shown) via an O ring 9.

Figure 2:
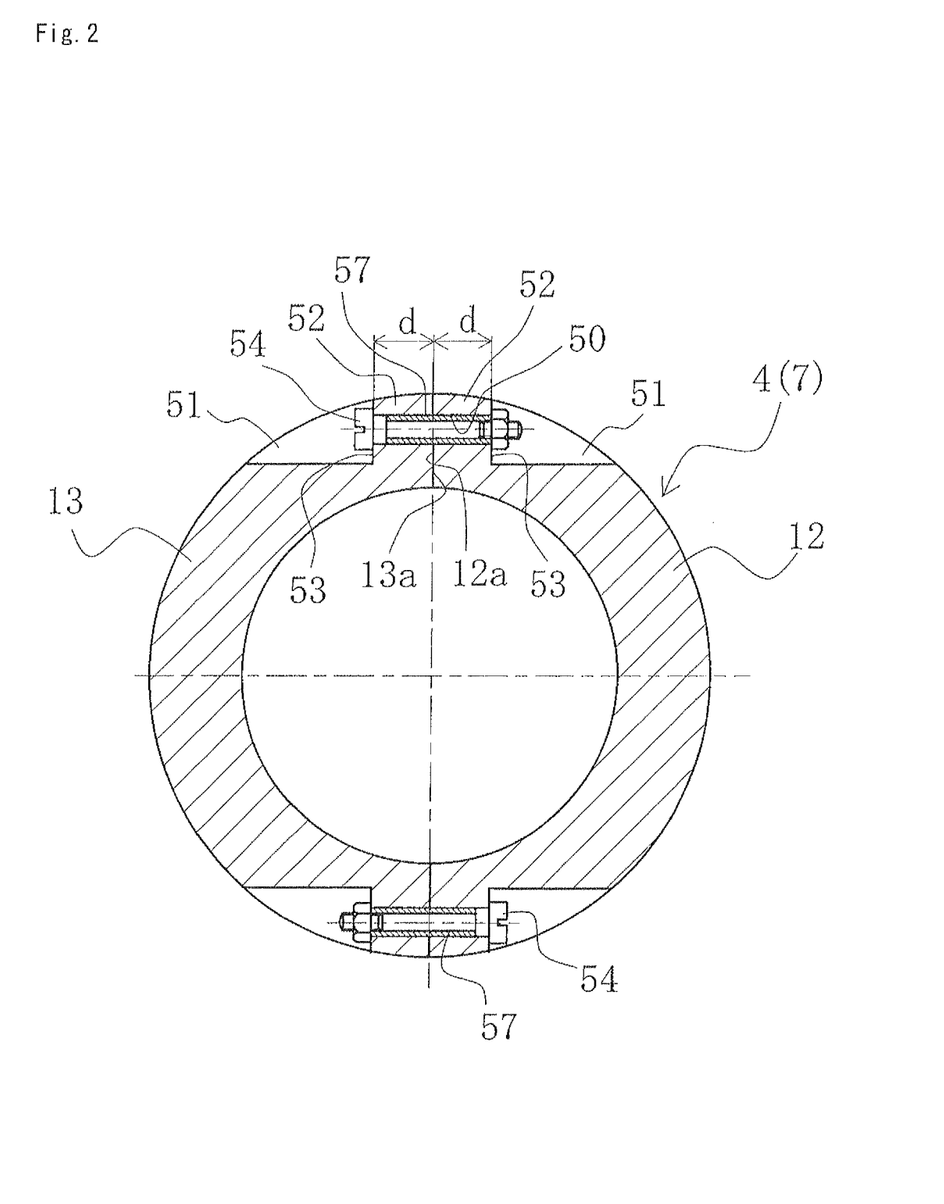
FIG. 2 is a sectional view showing a divided sealing ring of the division type mechanical seal according to the first embodiment of the present invention.

The stationary sealing ring 4 has the sealing end face 4a on one end face, and is formed in an annular body as shown in FIG. 2, divided into divided sealing rings 12, 13 which are divided into a plurality of (two in the present example) arcs in the circumferential direction, and formed in an annular mode in which divided contact faces (circumferential end faces of the arc divided bodies 12, 13) 12a, 13a are closely attached. As described later, the stationary sealing ring is fitted into and held by the division retainer 3.

As well as the stationary sealing ring 4, the rotating sealing ring 7 has the sealing end face 7a on one end face, and is formed in an annular body, divided into divided sealing rings which are divided into a plurality of (two in the present example) arcs in the circumferential direction, and formed in an annular mode in which divided contact faces (circumferential end faces of the arc divided bodies) are closely attached. As described later, the rotating sealing ring is fitted into and held by the division retainer 6.

It should be noted that for convenience of description, the same reference signs 12, 13 as in the case of the stationary sealing ring 4 will be sometimes used for the divided sealing rings forming the rotating sealing ring 7 stylizing as "7 (12, 13)".

The division retainer 6 into and by which the rotating sealing ring 7 is fitted and held is fixed and held to the rotating shaft 5 via a rotating ring collar 14 fixed to the rotating shaft 5. That is, the rotating ring collar 14 is divided in the circumferential direction, and fitted and fixed to the rotating shaft 5 by being fastened in a ring shape by a fastening bolt 15.

Between the rotating ring collar 14 and the division retainer 6, a spring 16 that biases the rotating sealing ring 7 rightward so as to press and bring the rotating sealing ring into contact with the stationary sealing ring 4 is placed.

The rotating sealing ring 7 is made of for example a hard material such as silicon carbide. The stationary sealing ring 4 is made of for example carbon having a self-lubricating property which is softer than the rotating sealing ring 7 or the like.

The division retainer 3 into and by which the stationary sealing ring 4 is fitted and held and the division retainer 6 into and by which the rotating sealing ring 7 is fitted and held are attached to the sealing end faces 4a, 7a symmetrically as shown in FIG. 1 and have the same structure.

Based on FIG. 1, a sectional shape cut by a section along the axial direction of the divided sealing rings 12, 13 forming the stationary sealing ring 4 will be described.

In a sectional shape on the outer circumferential side of the divided sealing rings 4 (12, 13) forming the stationary sealing ring 4, a center portion 20 in the width direction is high, a side face on the opposite side of the sealing end face 4a has a vertical level difference portion 21, and a side face on the side of the sealing end face 4a has a sloping level difference portion 22 having an obtuse angle, so that both the sides are low. The low part having the vertical level difference portion 21 is extended and a division O ring 23 that seals a space from the seal case 2 is installed. On the other side, the above sealing end face 4a is formed in an end of the low part having the sloping level difference portion 22 having an obtuse angle.

The division retainer 3 on the stationary side is an annular body made of stainless steel, and divided into a plurality of (two in the present example) arcs in the circumferential direction, and formed in an annular mode in which the divided contact faces are closely attached. The divided contact faces are closely attached by a fastening bolt 26.

A sectional shape of the inner circumferential side of the division retainer 3 on the stationary side which opposes to the outer circumferential side of the divided sealing ring 4 (12, 13) on the stationary side is formed in a shape substantially matching the sectional shape on the outer circumferential side of the divided sealing ring 4 (12, 13). A groove 27 having a rectangular section is formed over the entire circumference at a position corresponding to the vertical level difference portion 21 of the divided sealing ring 4 (12, 13), and a fitting hole having a rectangular section for fitting a division split ring 32 to be described later is fitted is formed by the vertical level difference portion 21 of the divided sealing ring 4 (12, 13) and the rectangular groove 27 of the division retainer 3.

The inner circumferential side of the division retainer 3 corresponding to the sloping level difference portion 22 having an obtuse angle of the divided sealing ring 4 (12, 13) on the stationary side is formed at a substantially right angle so as to form a substantially triangle gap.

A sectional shape on the outer circumferential side of the rotating sealing ring 7 is formed in the same shape as the stationary sealing ring 4 yet symmetrically. On the inner circumferential side, a groove 30 is provided in such a manner that a division O ring 29 that seals a space from an outer circumferential face of the rotating shaft 5 is installed. The rotating sealing ring 7, the O ring 29, a backup ring 31, and the rotating ring collar 14 are stably held by the spring 16 installed between the rotating ring collar 14 and the division retainer 6 and a drive pin 49. Thus, the division O ring 29 is also surely held in the groove 30 in a state of being pressed in the axial direction by the backup ring 31.

Into the division split ring fitting hole formed by the vertical level difference portion 21 of the divided sealing ring 4 (12, 13), 7 (12, 13) and the rectangular groove 27 of the division retainer 3, 6, the division split ring 32 made of stainless steel having a rectangular section and formed in an arc having the same length as arc length of the division split ring fitting hole is fitted.

It should be noted that the division split ring 32 is described in detail in Japanese Patent Application No. 2010-511040 (WO2009/136539) already filed by the applicant, and detailed description thereof will be omitted in the present application.

Figure 3:
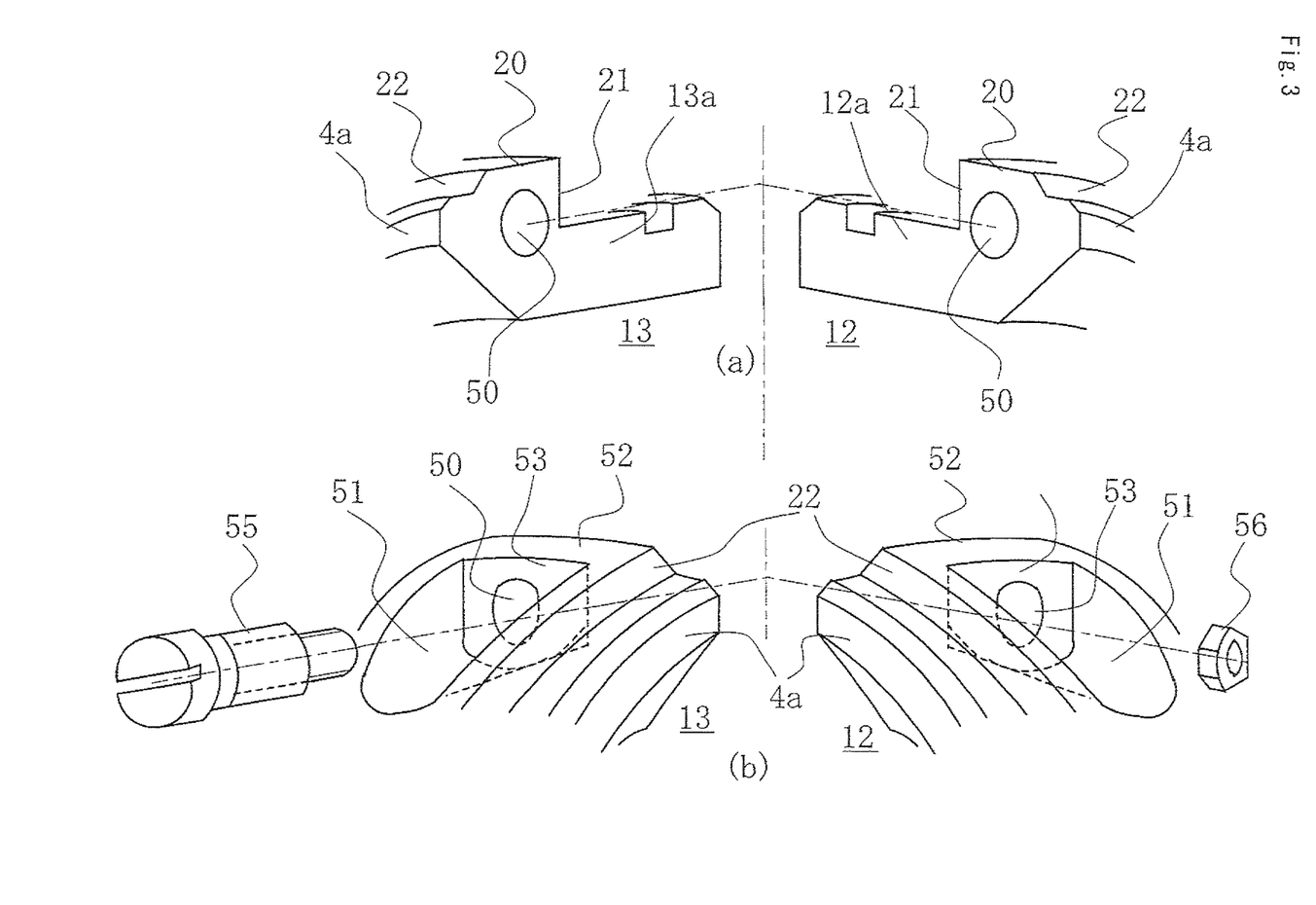
FIG. 3 is a perspective view showing the vicinity of divided contact faces of the divided sealing rings of the division type mechanical seal according to the first embodiment of the present invention.

Next, with reference to FIGS. 2 and 3, a coupling configuration of the divided sealing rings 12, 13 forming the stationary sealing ring 4 and the rotating sealing ring 7 will be described.

FIG. 2 shows a state where the stationary sealing ring 4 is cut by a face orthogonal to the axial direction. Since the rotating sealing ring 7 has the same shape, the stationary sealing ring 4 will be described as an example.

In FIG. 2, a through hole portion 50 is formed over the two divided sealing rings 12, 13 so as to go over the divided contact faces 12a, 13a of the two divided sealing rings 12, 13 adjacent to each other in the circumferential direction. As shown in FIG. 3, the through hole portion 50 is positioned in the vicinity of the above center portion 20 in the width direction of the divided sealing rings 12, 13, positioned on the slightly outer diameter side of center of thickness in the radial direction, and provided in the direction orthogonal to the divided contact faces 12a, 13a. As shown in FIGS. 2 and 3(*b*), upon providing the through hole portion 50, concave portions 51, 51 sandwiching the divided contact faces 12a, 13a and extending in the direction orthogonal to the divided contact faces 12a, 13a from positions away from the divided contact faces 12a, 13a by a predetermined distance d are respectively formed in the divided sealing rings 12, 13. By formation of the concave portions 51, 51, flange portions 52, 52 are formed at positions of the divided sealing rings 12, 13 where the through hole portion 50 is formed, and outer side faces 53, 53 of the flange portions 52, 52 form fastening faces of a coupling tool 54 to be described later.

Upon forming the through hole portion 50, the through hole portion 50 is formed in an annular state before dividing the stationary sealing ring 4 or the rotating sealing ring 7 and then the sealing ring is divided to be divided sealing rings, or the through hole portion 50 is formed after dividing the stationary sealing ring 4 or the rotating sealing ring 7 and then combining the divided sealing rings into an annular form with high precision. Thereby, at the time of assembling on the shaft, the highly precise annular stationary sealing ring 4 or rotating sealing ring 7 can be obtained.

Next, a configuration of the coupling tool 54 will be described.

Figure 4:
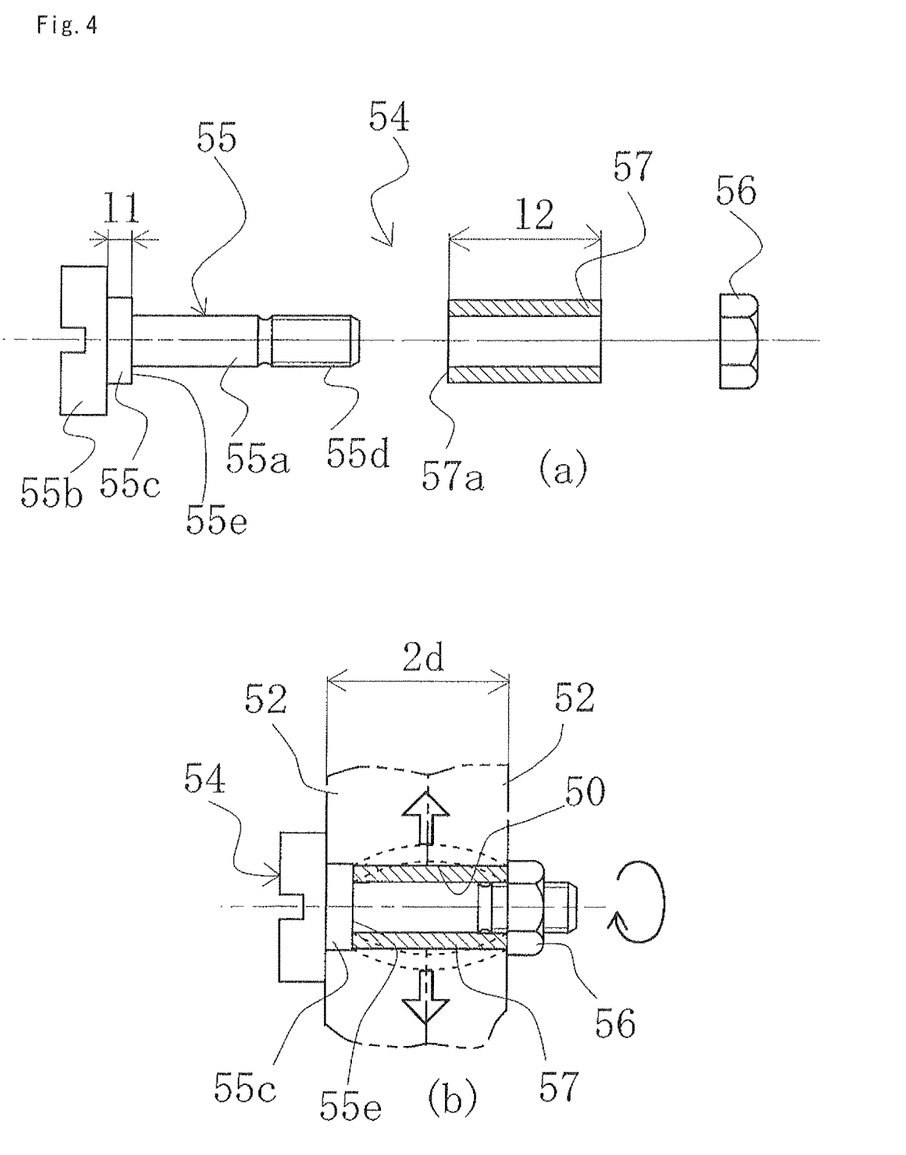
FIG. 4 is a view showing a coupling tool of the division type mechanical seal according to the first embodiment of the present invention.

As shown in FIG. 4(*a*), the coupling tool 54 is formed by a bolt 55, a nut 56, and a tube 57 including a tubular body to be fitted to a shaft portion 55a of the bolt 55. One the near side of a head part 55b of the shaft portion 55a of the bolt 55, a centering portion 55c for maintaining the bolt 55 in a state where the bolt is substantially centered with respect to the through hole portion 50 at the time of fitting the bolt 55 into the through hole portion 50 is provided. On the leading end side of the shaft portion 55a, a male screw portion 55d is provided. A diameter of the centering portion 55c is set to be the substantially same as or slightly smaller than a diameter of the through hole portion 50. The tube 57 is fitted into the shaft portion 55a, and a diameter of the shaft portion 55a is set to be the substantially same as or slightly larger than an inner diameter of the tube 57. Further, an outer diameter of the tube 57 is set to be smaller than the diameter of the through hole portion 50. When the tube 57 is fitted into the shaft portion 55a, one side face 57a thereof is abutted and positioned with a side face 55e of the centering portion 55c.

The sum of axial length l1 of the centering portion 55c and axial length l2 of the tube 57 is set to be larger than thickness 2d of the flange portions 52, 52 of the divided sealing rings 12, 13.

$$2d < l1 + l2$$

Therefore, as shown in FIG. 4(b), when the coupling tool 54 is inserted into the through hole portion 50 of the flange portions 52, 52 and the two adjacent divided sealing rings 12, 13 are coupled by fastening the nut 56, the tube 57 is compressed in the axial direction by the side face 55e of the centering portion 55c and an inner side face of the nut 56. When being compressed in the axial direction, the tube 57 is expanded in the outer diameter direction.

In the present, example, there is no gap on the inner diameter side of the tube 57 but there is a gap on the outer diameter side. Thus, the tube is not expanded in the inner diameter direction but expanded in the outer diameter direction as shown by arrows.

The relationship between the sum of the axial length l1 of the centering portion 55c and the axial length l2 of the tube 57 and the thickness 2d of the flange portions 52, 52 of the divided sealing rings 12, 13 is not limited to the above expression. The relationship may be anything as long as the tube is expanded on the outer diameter side when the tube is compressed in the axial direction. For example, a shape of a centering portion to be inserted into the through hole portion may be provided in the nut 56, or a maximum outer diameter of the nut may be smaller than inner diameter size of the through hole portion and the bolt, the tube, and the nut may be capable of being integrally inserted into the through hole portion.

A material of the tube 57 is selected from flexible and to some extent corrosive materials. For example, as synthetic resin, the materials include polytetrafluoroethylene (PTFE), perfluoroalkoxy (PFA), a copolymer of tetrafluoroethylene and hexafluoropropylene (FEP), vinyl resin, and urethane resin.

As metal, any metal materials are acceptable as long as the materials are elastically deformable and corrosive to some extent. Shapes include a spiral shape linear body having a spring function and a tubular body having a cut face in the longitudinal direction.

In order to make the tube 57 easily expandable in the outer diameter direction, in a case where the material is synthetic resin, the diameter of the shaft portion 55a of the bolt is slightly larger than the inner diameter of the tube 57, so that deformation toward the inner diameter side is prevented and the tube can be efficiently deformed to the outer diameter side.

In a case where the material is a deformable metal material, with the tube formed in a spiral shape linear body having a spring function, desirably, a taper is provided on parts in contact with the tube so as to prevent both end faces of the tube from escaping to the outer diameter side, that is, on the side face 55e of the centering portion 55c and the inner side face of the nut 56, or a shape of the spiral shape linear body is preliminarily formed in a drum shape in which the center portion in the axial direction of the bolt is expanded to the outer diameter side. Further, with the tube formed in a tubular body having a cut face in the longitudinal direction, desirably, a taper is provided on the parts in contact with the tube so as to prevent both the end faces of the tube from escaping to the outer diameter side, that is, on the side face 55e of the centering portion 55c and the inner side face of the nut 56.

As shown in FIG. 4(b), when the coupling tool 54 is inserted into the through hole portion 50 of the flange portions 52, 52 and the two adjacent divided sealing rings 12, 13 are coupled by fastening the nut 56, the sum of the axial length l1 of the centering portion 55c and the axial length l2 of the tube 57 is set to be larger than the thickness 2d of the flange portions 52, 52 of the divided sealing rings 12, 13. Thus, the tube 57 is compressed in the axial direction by the side face of the centering portion 55c and the side face of the nut 56 and expanded in the outer diameter direction as shown by the arrows. When the tube 57 is expanded in the outer diameter direction, an outer face of the tube 57 is brought into strong pressure contact with a face of the through hole portion 50 of the flange portions 52, 52. As a result, assembling precision on the divided contact faces of the divided sealing rings 12, 13 can be ensured in the radial direction and in the axial direction.

Second Embodiment

Figure 5:
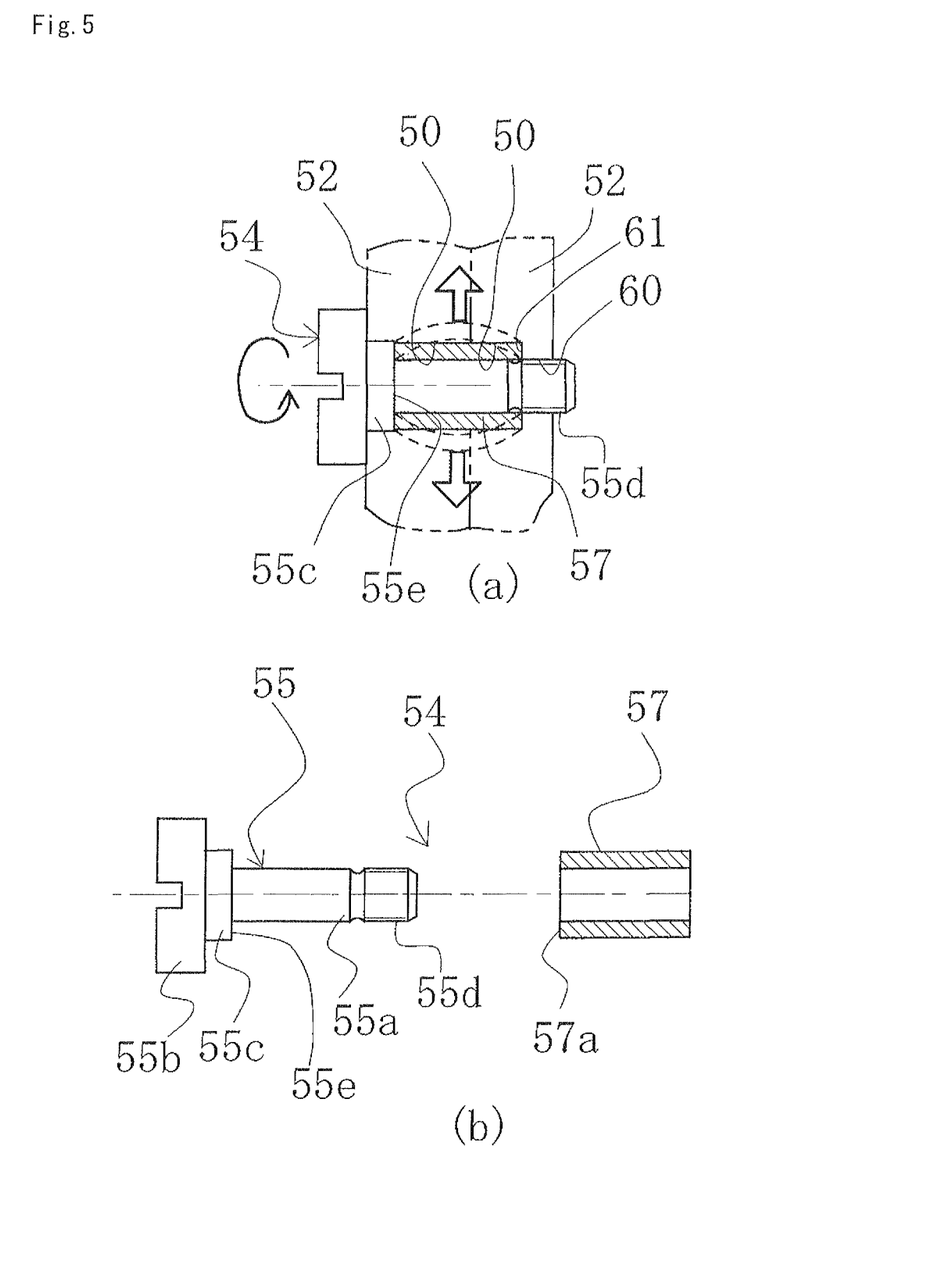
FIG. 5 shows a division type mechanical seal according to a second embodiment of the present invention.

Next, with reference to FIG. 5, a coupling configuration of divided sealing rings 12, 13 forming a stationary sealing ring 4 and a rotating sealing ring 7 according to a second embodiment will be described.

The coupling configuration of the divided sealing rings 12, 13 according to the second embodiment is different from the first embodiment in a point where the nut is omitted in the coupling tool. However, other basic configurations are the same as the first embodiment. The same members will be given the same reference signs and duplicated description will be omitted.

In FIG. 5(a), in one flange portion 52 among flange portions 52, 52 of the divided sealing rings 12, 13, a through hole portion 50 is formed over the entire width. In the other flange portion 52, the through hole portion 50 is formed on the axially inner side and a female screw portion 60 is formed on the axially outer side.

A bolt 55 is inserted from the side where the through hole portion 50 is formed over the entire width. The flange portions 52, 52 can be fastened by screwing a male screw portion 55d on a leading end of the bolt 55 into the female screw portion 60.

As shown in FIG. 5(b), a coupling tool 54 is formed by the bolt 55 and a tube 57 including a tubular body to be fitted to a shaft portion 55a of the bolt 55.

As shown in FIG. 5(a), one end of the tube 57 is abutted with a side face 55e of a centering portion 55c, and the other end is abutted with a step portion 61 formed on a border between the female screw portion 60 and the through hole portion 50. Therefore, axial length of the tube 57 is set to be larger than a gap between the side face 55e and the step portion 61 after fastening the bolt 55. In accordance with fastening of the bolt 55, the tube is compressed in the axial direction by the side face 55e and the step portion 61 and expanded in the outer diameter direction as shown by arrows. When the tube 57 is deformed in the outer diameter direction, an outer face of the tube 57 is brought into strong pressure contact with a face of the through hole portion 50 of the flange portions 52, 52. As a result, assembling precision on divided contact faces of the divided sealing rings 12, 13 can be ensured in the radial direction and in the axial direction.

In the second embodiment, no nut is required in comparison to the first embodiment. Thus, the number of parts can be reduced, and a task of screwing the bolt can be easily performed even upon fastening the flange portions 52, 52 by the coupling tool.

It should be noted that the second embodiment is suitable for a case where the divided sealing rings 12, 13 are made of metal.

As described above, according to the configurations of the first and second embodiments, the coupling tool 54 exerts the same function as the conventionally known metal taper pin in terms of assembling precision. Thus, assembling precision on the divided contact faces of the divided sealing rings 12, 13 is ensured in the radial direction and in the axial direction as a matter of course, and effects as described below are exhibited in comparison to the taper pin.

(1) Unlike in the conventionally known metal taper pin, confirmation of abutment and an abutment refining task (surface finishing) can be deleted. Thus, a processing time can be shortened to a great extent.

(2) In a case of the conventionally known metal taper pin, there is a need for a task of improving precision. However, in a case of the coupling tool 54, since the tube 57 follows the shape and the size of the through hole portion 50, there is no need for the task of improving precision and hence a processing property is refined.

(3) A temporary assembling state of the divided sealing rings 12, 13 can be maintained by utilizing friction between the outer face and the inner face of the through hole portion 50 due to deformation of the tube 57. Thus, at the time of a task of adjusting the divided contact faces of the divided sealing rings 12, 13 in a state where the nut 56 of the coupling tool 54 is not fastened or the like, the divided sealing rings 12, 13 can be stably held.

(4) In case of the conventionally known metal taper pin, when an excessive load is applied to the divided sealing rings 12, 13 made of a brittle material at the time of assembling, this leads to breakage of the divided sealing rings 12, 13. However, in a case of the coupling tool 54, even when an excessive load is applied, the tube 57 serves as a buffering member and hence no breakage is caused.

(5) At the time of disassembling the divided sealing rings 12, 13, in a case of the conventionally known metal taper pin, too close attachment generates large resistance, and thus detachment becomes difficult at the worst. However, in a case of the coupling tool 54, since the tube 57 is deformed, the detachment is easily performed.

(6) In a case where the tube 57 is made of synthetic resin, a property of inserting the coupling tool into the through hole portion of the divided sealing rings and contradicting resistance are moderately favorable. Thus, workability can be improved.

Next, an assembling procedure up to final assembling of the stationary sealing ring 4 fixed to the seal case 2 via the division retainer 3 and the rotating sealing ring 7 fixed to the rotating shaft 5 via the division retainer 6 will be described.

Work Step 1: Temporary Assembling

The divided parts (the retainers 3, 6 and the divided sealing rings 12, 13) are assembled on the rotating shaft 5. The divided contact faces of the divided sealing rings 12, 13 are in contact with each other but not completely fastened by a fastening member such as a coupling tool.

Work Step 2: Divided Contact Face Precision Adjustment 1

The temporarily assembled divided contact faces of the divided sealing rings 12, 13 are adjusted one by one so as to improve precision of the divided contact faces. After the work, the divided contact faces are inclose contact with each other and matching precision of the divided contact faces is improved. However, the divided contact faces are not completely fastened by the fastening member such as the coupling tool.

Work Step 3: Retainer Temporary Assembling

The retainers 3, 6 on the outer circumferential side of the divided sealing rings 12, 13 are fastened. The bolts of the retainers 3, 6 are fastened.

Work Step 4: Divided Contact Face Precision Adjustment 2

After temporarily assembling the divided sealing rings 12, 13 to the retainers 3, 6, the divided sealing rings are pushed in the axial direction by using a set jig (not shown) until axial length thereof becomes attachment length. Precision in the axial direction is improved.

Work Step 5: Fixing of Divided Sealing Ring 12, 13

In a state where the divided sealing rings 12, 13 are retained by the retainers 3, 6, the divided contact faces of the divided sealing rings 12, 13 are coupled and fixed by the coupling tool 54.

Work Step 6: Fixing of Rotation Sealing Ring to Rotating Shaft

The bolt 15 of the rotating ring collar 14 is fastened. The rotating sealing ring 7 is fixed to the rotating shaft 5.

The embodiments of the present invention are described above with the drawings. However, specific configurations are not limited to these embodiments but modifications and additions that are made within the range not departing from the gist of the present invention are also included in the present invention.

For example, the case where the division retainer 3 is installed on the outer circumferential side of the stationary sealing ring 4 and the division retainer 6 is installed on the outer circumferential side of the rotating sealing ring 7 is described in the embodiments. However, the present invention is not limited to this but can also be applied to a type where the division retainers 3, 6 on the outer circumferential side are not installed.

For example, the case where the stationary sealing ring 4 and the rotating sealing ring 7 are divided is described in the embodiments. However, the present invention is not limited to this but any one of the stationary sealing ring 4 and the rotating sealing ring 7 may be divided.

For example, the case where the through hole portion 50 is positioned in the vicinity of the center portion 20 in the width direction of the divided sealing rings 12, 13 and positioned on the slightly outer diameter side of the center of the thickness in the radial direction is described in the embodiments. However, the present invention is not limited to this but the through hole portion is positioned anywhere the through hole portion 50 can be formed.

For example, the bolt 55 is used as a constituent member of the coupling tool 54 in the embodiments. The bolt in this case indicates a mechanical element for fastening and fixing a part and another part, including a shaft portion threaded to make a male screw and a head portion to be used for fastening together with a mechanical element called nut or being screwed into a hole (tap) threaded to make a female screw. The bolt is not limited to a hexagon bolt but includes a thumbscrew, a pin with a head portion, and the like.

REFERENCE SIGNS LIST

1 Housing
2 Seal case
3 Division retainer
4 Stationary sealing ring
5 Rotating shaft
6 Division retainer
7 Rotating sealing ring
8 Spring
9 O ring
12 Divided sealing ring
12a Divided contact face
13 Divided sealing ring
13a Divided contact face
14 Rotating ring collar
15 Fastening bolt
16 Spring
20 Center portion in width direction of divided sealing ring
21 Vertical level difference portion of divided sealing ring
22 Sloping level difference portion of divided sealing ring
23 Division O ring
26 Fastening bolt
27 Rectangular groove of division retainer
29 Division O ring
30 Groove
31 Backup ring
32 Division split ring
36 Buffering member
50 Through hole portion
51 Concave portion
52 Flange portion
53 Outer side face of flange portion
54 Coupling tool
55 Bolt
56 Nut
57 Tube
60 Female screw portion
61 Step portion

The invention claimed is:

1. A division type mechanical seal in which a stationary sealing ring provided on a side of a housing or a rotating sealing ring provided on a rotation shaft which is inserted into the housing is a divided sealing ring divided in the circumferential direction, the division type mechanical seal that does sealing by sealing end faces serving as opposing end faces of the stationary sealing ring and the rotating sealing ring, the division type mechanical seal comprising:

a through hole portion formed over two divided sealing rings so as to go over divided contact faces of the two divided sealing rings adjacent to each other in the circumferential direction; and a coupling tool inserted into the through hole portion to couple the two adjacent divided sealing rings, wherein:

the coupling tool includes a bolt, a nut, and a tube, the bolt being constituted by a head part, a shaft portion and a centering portion between the head part and the shaft portion, the tube being seamless in a circumferential direction and fitted to the shaft portion of the bolt, the centering portion of the bolt having a diameter which is substantially equal to or slightly smaller than a diameter of the through hole portion and which is smaller than that of the head part of the bolt and larger than that of the shaft portion of the bolt, to keep a centering between the bolt and the through hole portion, the centering portion being fitted into the through hole portion of only one of the two divided sealing rings, a side end face of the tube being abutted with a side end face of the centering portion when the tube is fitted to the shaft portion of the bolt, thereby positioning a middle part of the tube in a vicinity of a border between the two divided sealing rings, and wherein when the bolt and the nut are fastened, the tube is compressed in an axial direction between the centering portion of the bolt and the nut, and as a result the middle part of the tube is expanded in an outer diameter direction so as to separate an inner peripheral surface of the middle part of the tube from a peripheral surface of the shaft portion of the bolt, thereby coupling the two divided sealing rings.

2. The division type mechanical seal as set forth in claim 1, wherein:

the tube is formed in a tubular body made of synthetic resin.

3. The division type mechanical seal as set forth in claim 2, wherein:

an outer diameter of the shaft portion of the bolt is set to be larger than an inner diameter of the tube.

4. A division type mechanical seal in which a stationary sealing ring provided on a side of a housing or a rotating sealing ring provided on a rotation shaft which is inserted into the housing is a divided sealing ring divided in the circumferential direction, the division type mechanical seal that does scaling by sealing end faces serving as opposing end faces of the stationary sealing ring and the rotating sealing ring, the division type mechanical seal comprising:

a through hole portion formed over two divided sealing rings so as to go over divided contact faces of the two divided sealing rings adjacent to each other in the circumferential direction;

a female screw portion formed in the through hole portion in one of the two divided sealing rings; and a coupling tool inserted into the through hole portion to couple the two divided sealing rings, wherein:

the coupling tool includes a bolt and a tube, the bolt being constituted by a head part, a shaft portion and a centering portion between the head part and the shaft portion, the tube being seamless in a circumferential direction and fitted to the shaft portion of the bolt, the centering portion of the bolt having a diameter which is substantially equal to or slightly smaller than a diameter of the through hole, portion and which is smaller than that of the head part of the bolt and larger than that of the shaft portion of the bolt, to keep a centering between the bolt and the through hole portion, the centering portion being fitted into the through hole portion of only one of the two divided sealing rings, a side end face of the tube is abutted with a side end face of the centering portion of the bolt when the tube is fitted to the shaft portion of the bolt, thereby positioning a middle part of the tube in a vicinity of a border between the two divided sealing rings, and wherein when the bolt and the female screw portion are fastened, the tube is compressed in an axial direction between the centering portion of the bolt and the female screw portion, and as a result the middle part of the tube is expanded in an outer diameter direction so as to separate an inner peripheral surface of the middle part from a peripheral surface of the shaft portion of the bolt, thereby coupling the two divided sealing rings.

* * * * *

UNITED STATES PATENT AND TRADEMARK OFFICE
CERTIFICATE OF CORRECTION

PATENT NO. : 10,077,843 B2
APPLICATION NO. : 14/912041
DATED : September 18, 2018
INVENTOR(S) : Sato Page 1 of 1

It is certified that error appears in the above-identified patent and that said Letters Patent is hereby corrected as shown below:

In the Claims

Claim 1, Column 13, Line 53, "scaling" should be --sealing--.

Claim 4, Column 14, Line 32, "scaling" should be --sealing--.

Signed and Sealed this
Twenty-third Day of April, 2019

Andrei Iancu
*Director of the United States Patent and Trademark Office*